US010911100B2

(12) United States Patent
Lee

(10) Patent No.: US 10,911,100 B2
(45) Date of Patent: Feb. 2, 2021

(54) ELECTRONIC DEVICE FOR CONTROLLING SPECIFIED FUNCTIONS BASED ON ELECTROMAGNETIC SIGNAL DETECTION AND METHOD THEREOF

(71) Applicant: Samsung Electronics Co., Ltd., Gyeonggi-do (KR)

(72) Inventor: Woosup Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/545,670

(22) Filed: Aug. 20, 2019

(65) Prior Publication Data

US 2020/0059268 A1 Feb. 20, 2020

(30) Foreign Application Priority Data

Aug. 20, 2018 (KR) .................. 10-2018-0096903

(51) Int. Cl.
| H04B 5/00 | (2006.01) |
| H04W 4/80 | (2018.01) |
| G06Q 20/32 | (2012.01) |
| H04W 12/06 | (2009.01) |
| H04W 4/20 | (2018.01) |

(52) U.S. Cl.
CPC ....... *H04B 5/0037* (2013.01); *G06Q 20/3278* (2013.01); *H04W 4/20* (2013.01); *H04W 4/80* (2018.02); *H04W 12/06* (2013.01)

(58) Field of Classification Search
CPC ....... G06K 19/06206; G06K 19/07779; G06K 19/07784; G06Q 20/3221; G06Q 20/3278; G06Q 7/0893
See application file for complete search history.

(56) References Cited

U.S. PATENT DOCUMENTS

| 10,404,695 B2 | 9/2019 | Jang |
| 2010/0275259 A1 | 10/2010 | Adams et al. |
| 2013/0078921 A1 | 3/2013 | Wilson et al. |

(Continued)

FOREIGN PATENT DOCUMENTS

| KR | 1020160103354 | 9/2016 |
| KR | 1020170050055 | 5/2017 |

(Continued)

OTHER PUBLICATIONS

Fairchild Korea Semiconductor Co., Ltd., "Wireless charging system technology and solution", © Kakao Corp., Mar. 20, 2013, . . . http://m.blog.daum.net/fairchild2011/141?tp_nil_a=1, pp. 25.

(Continued)

*Primary Examiner* — David Bilodeau
(74) *Attorney, Agent, or Firm* — The Farrell Law Firm, P.C.

(57) ABSTRACT

An electronic device is provided. The electronic device includes a first sensor configured to obtain an electromagnetic (EM) signal from an external device, a first communication module configured to provide a magnetic stripe transmission (MST) signal, a processor, and a memory coupled with the processor, wherein the memory is configured to store instructions which, upon execution, instruct the processor to control the first communication module to transmit, to the external device, the MST signal which is predetermined corresponding to the external device based on the obtained EM signal.

20 Claims, 11 Drawing Sheets

(56) References Cited

U.S. PATENT DOCUMENTS

| | | | |
|---|---|---|---|
| 2016/0247057 A1 | 8/2016 | Lee et al. | |
| 2016/0247144 A1* | 8/2016 | Oh | G06Q 20/3278 |
| 2016/0354042 A1* | 12/2016 | Shim | G06F 21/32 |
| 2016/0364715 A1* | 12/2016 | Cho | G06Q 20/325 |
| 2017/0017938 A1 | 1/2017 | Lee et al. | |
| 2017/0053264 A1 | 2/2017 | Maung et al. | |
| 2017/0061419 A1 | 3/2017 | Kim et al. | |
| 2017/0083877 A1 | 3/2017 | Dix | |
| 2017/0223514 A1* | 8/2017 | Do | H04W 4/21 |
| 2019/0080312 A1* | 3/2019 | Yeager | G06Q 20/3223 |

FOREIGN PATENT DOCUMENTS

| | | |
|---|---|---|
| KR | 1020170096825 | 8/2017 |
| WO | WO 03/007623 | 1/2003 |

OTHER PUBLICATIONS

International Search Report dated Dec. 4, 2019 issued in counterpart application No. PCT/KR2018/010588, 8 pages.
European Search Report dated Jan. 3, 2020 issued in counterpart application No. 19192658.3-1220, 9 pages.

\* cited by examiner

ELECTRONIC DEVICE FOR CONTROLLING SPECIFIED FUNCTIONS BASED ON ELECTROMAGNETIC SIGNAL DETECTION AND METHOD THEREOF

CROSS-REFERENCE TO RELATED APPLICATION(S)

This application is based on and claims priority under 35 U.S.C. § 119 to Korean Patent Application No. 10-2018-0096903, filed on Aug. 20, 2018, in the Korean Intellectual Property Office, the disclosure of which is incorporated by reference herein in its entirety.

BACKGROUND

1. Field

The present disclosure relates to an electronic device for controlling specified functions on the basis of obtaining an electromagnetic (EM) signal, and a method thereof.

2. Description of Related Art

Currently, a technology for providing various functions to electronic devices by using magnetic field communication is being developed. These electronic devices can, for example, perform magnetic field communication with external electronic devices, to perform specified functions such as a payment function. Also, the electronic devices can perform a wireless charging function in a magnetic induction scheme.

Magnetic field communication can be, for example, implemented through a magnetic induction scheme of switching the direction of an electric current flowing in a transmission coil, to generate a magnetic flux and induce an electric current in a reception coil. But the magnetic induction scheme results in heavy performance degradation, based on a distance between the transmission coil and the reception coil or a coupling environment, and even easily brings about signal distortion. This performance degradation and signal distortion can be, particularly, more heavily brought about by failure to comply with the standard or execution of communication with a crude external device, and further can cause damage to the hardware of an electronic device as well.

But, in performing magnetic field communication, in many cases, the electronic device performs the magnetic field communication in a state in which information on an external device is insufficient and thus, there is a need to acquire the information on the external device before or in the beginning of communication execution. Also, power consumption and security problems can occur as the electronic device transmits a signal from before approaching the external device for the purpose of communication execution.

Technological solutions the present disclosure seeks to achieve are not limited to the above-mentioned technological solutions, and other technological solutions not mentioned above would be able to be clearly understood by a person having ordinary skill in the art from the following description.

SUMMARY

In accordance with an aspect of the present disclosure, an electronic device is provided. The electronic device includes a first sensor configured to obtain an electromagnetic (EM) signal from an external device, a first communication module configured to provide a magnetic stripe transmission (MST) signal, a processor, and a memory coupled with the processor, wherein the memory is configured to store instructions which, upon execution, enable the processor to control the first communication module to transmit, to the external device, the MST signal which is predetermined corresponding to the external device based on the obtained EM signal.

In accordance with another aspect of the present disclosure, a method for controlling in an electronic device having a first sensor configured to obtain an EM signal and a first communication module configured to provide an MST signal is provided. The method includes obtaining the EM signal from an external device, and transmitting the MST signal which is predetermined corresponding to the external device based on the obtained EM signal.

In accordance with another aspect of the present disclosure, an electronic device is provided. The electronic device includes an EM sensor configured to obtain an EM signal from at least one external device; an MST communication module configured to provide an MST signal; and a processor configured to control the MST communication module to transmit, to the external device, the MST signal which is predetermined corresponding to the at least one external device based on the obtained EM signal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
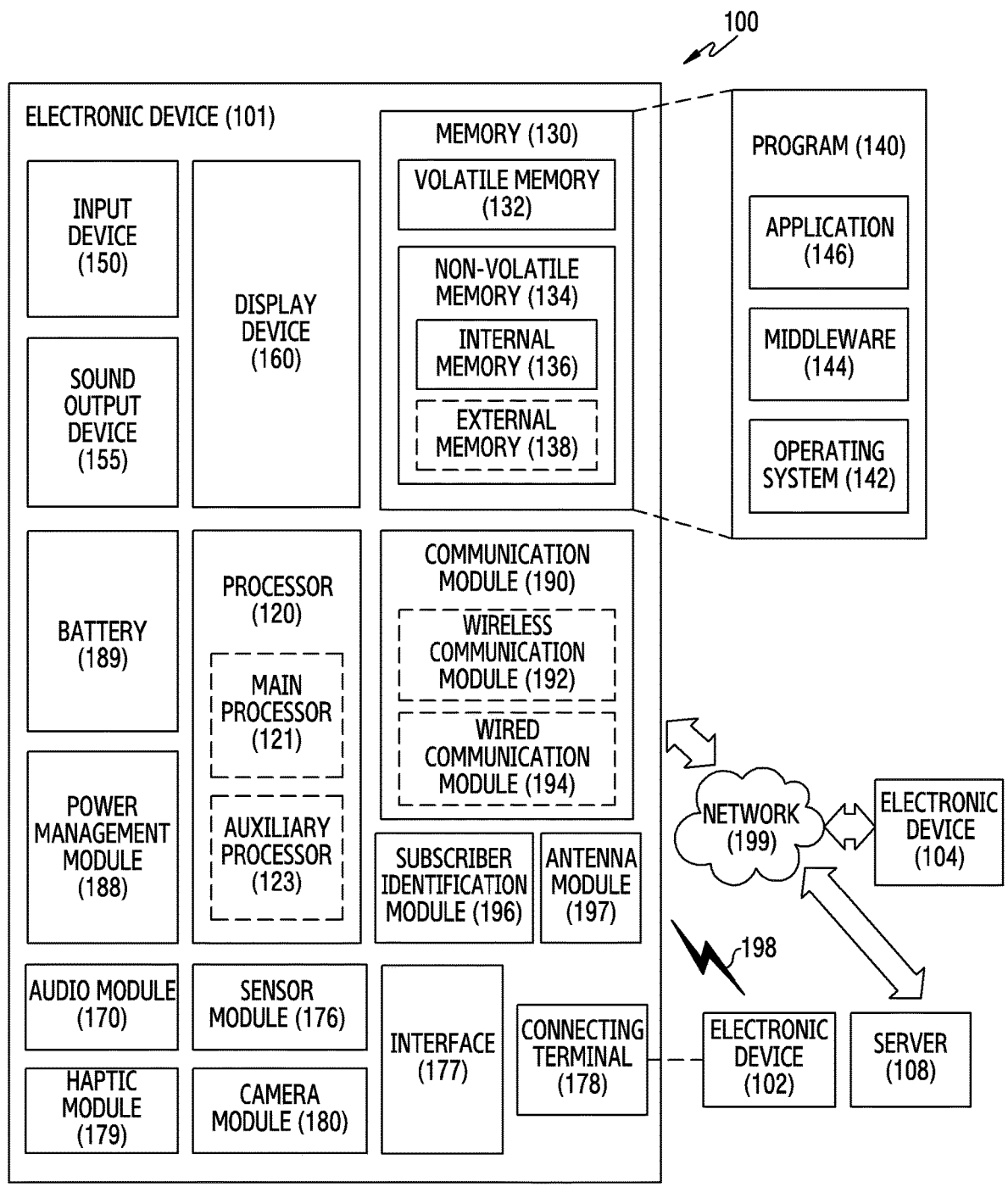
FIG. 1 is a block diagram of an electronic device within a network environment, according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a particular function. The auxiliary processor 123 may be implemented as separate from, or as part of, the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred due to the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device 102 directly (e.g., wiredly) or wirelessly. The interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device 102. The connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or in accordance with a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic devices may include a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, numerical terms, such as "1st" and "2nd," or "first" and "second", may be used to simply distinguish a corresponding component from another, and do not limit the components in other aspect (e.g., importance or order). If an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor of the electronic device 101 may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium, wherein the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
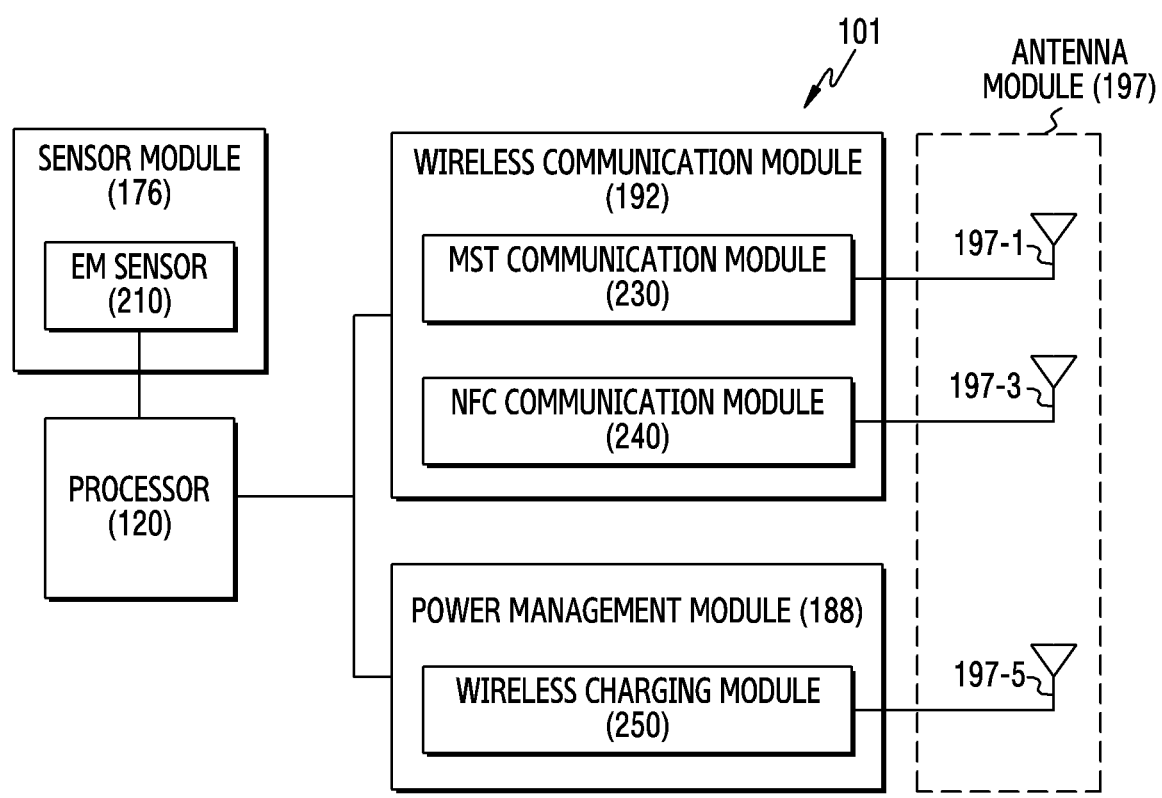
FIG. 2 is a block diagram of an electronic device for controlling a magnetic field communication related function based on obtaining an electromagnetic signal, according to an embodiment.

FIG. 2 is a block diagram 200 of the processor 120, the sensor module 176, the wireless communication module 192, the power management module 188, and the antenna module 197 of the electronic device 101 according to an embodiment.

Referring to FIG. 2, the sensor module 176 includes an EM sensor 210. The wireless communication module 192 includes an MST communication module 230 and a near-field communication (NFC) module 240, and the power management module 188 includes a wireless charging module 250. The antenna module 197 includes a plurality of antennas that include an MST antenna 197-1 connected with the MST communication module 230, an NFC antenna 197-3 connected with the NFC communication module 240, and a wireless charging antenna 197-5 connected with the wireless charging module 250. For ease of description, the same components as those described in regard to FIG. 1 are briefly described or may be omitted from the description.

The MST communication module 230 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 197-1. To generate the magnetic signal, the MST communication module 230 may include a switching module that includes one or more switches connected with the MST antenna 197-1, and control the switching module to change the direction of voltage or current supplied to the MST antenna 197-1 according to the received signal. The change of the direction of the voltage or current allows the direction of the magnetic signal (e.g., a magnetic field) emitted from the MST antenna 197-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. For example, payment-related information and a control signal that are received by the electronic device 102 in the form of the magnetic signal may be further transmitted to an external server 108 (e.g., a payment server) via the network 199.

The NFC communication module 240 may obtain a signal containing control information or payment information such as card information from the processor 120 and transmit the obtained signal to the external electronic device 102 via the NFC antenna 197-3. The NFC communication module 240 may receive such a signal transmitted from the external electronic device 102 via the NFC antenna 197-3.

The wireless charging module 250 may wirelessly transmit power to the external electronic device 102 (e.g., a cellular phone or wearable device) via the wireless charging antenna 197-5, or wirelessly receive power from the external electronic device 102 (e.g., a wireless charging device). The wireless charging module 250 may support one or more of various wireless charging schemes including, for example, a magnetic resonance scheme or a magnetic induction scheme.

The MST antenna 197-1, the NFC antenna 197-3, or the wireless charging antenna 197-5 may share at least part of their radiators. For example, the radiator of the MST antenna 197-1 may be used as the radiator of the NFC antenna 197-3 or the wireless charging antenna 197-5, or vice versa. In such a case, the antenna module 197 may include a switching circuit adapted to selectively connect (e.g., close) or disconnect (e.g. open) at least part of the antennas 197-1, 197-3, or 197-5, for example, under the control of the wireless communication module 192 (e.g., the MST communication module 230 or the NFC communication module 240) or the power management module (e.g., the wireless charging module 250). For example, when the electronic device 101 uses a wireless charging function, the NFC communication module 240 or the wireless charging module 250 may control the switching circuit to temporarily disconnect at least one portion of the radiators shared by the NFC antenna 197-3 and the wireless charging antenna 197-5 from the NFC antenna 197-3 and to connect the at least one portion of the radiators with the wireless charging antenna 197-5.

At least one function of the MST communication module 230, the NFC communication module 240, or the wireless charging module 250 may be controlled by an external processor 120. At least one specified function (e.g., a payment function) of the MST communication module 230 or the NFC communication module 240 may be performed in a trusted execution environment (TEE). The TEE may form an execution environment in which at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

The electronic device 101 may, for example, control the sensor module 176 including a biometric sensor such as a fingerprint sensor or an iris sensor, the MST communication module 230, the NFC communication module 240 and the memory 130 through the processor 120, to send a magnetic field from the MST communication module 230 to the POS or terminate the sending. The electronic device 101 may adjust an intensity of the magnetic field (i.e., an electric current intensity), or in response to a coil antenna being plural, the electronic device 101 may select the coil antenna used as well. To perform card or user authentication for payment through the sensor module 176, the processor 120 may acquire user's biometric information (e.g., fingerprint or iris).

Figure 3A:
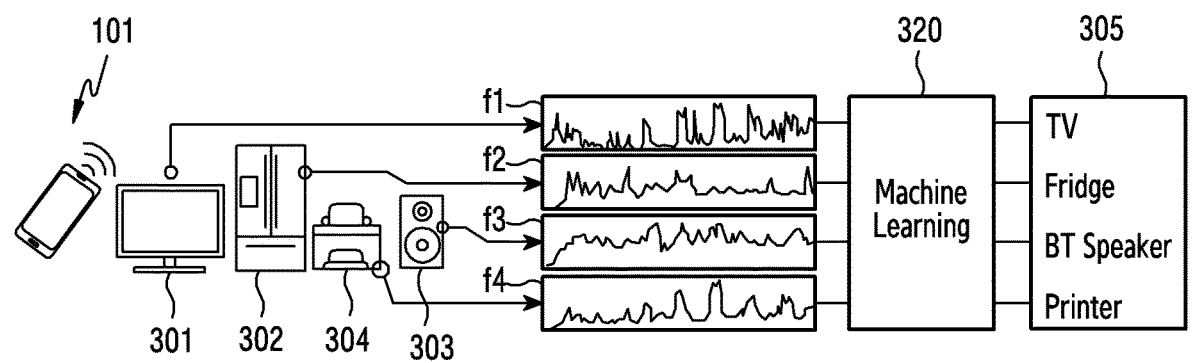
FIG. 3A is a diagram for explaining a concept of identifying external electronic devices by using an electromagnetic signal, according to an embodiment.

FIG. 3A is a diagram in which the electronic device 101 identifies external electronic devices 301, 302, 303 or 304 by using an EM signal according to an embodiment.

Referring to FIG. 3A, a plurality of external electronic devices 301, 302, 303 or 304 may be disposed around the electronic device 101. For instance, a TV 301, a refrigerator 302, a Bluetooth™ speaker 303 and a printer 304 may be disposed around the electronic device 101. The plurality of external electronic devices 301, 302, 303 or 304 may include various electronic components therein. The plurality of external electronic devices 301, 302, 303 or 304 may emit various EM signals by electromagnetic interference (EMI) provided from the internal electronic components. The EM signals may include a plurality of unique signals (f1, f2, f3, or f4) within a set frequency range. The electronic device 101 may acquire EM signals of a specific frequency band among the EM signals. For example, the electronic device 101 may acquire EM signals having a specific frequency at a frequency band of 1 Megahertz (MHz) or less through an EM sensor (e.g., the EM sensor 210 of FIG. 2).

In response to the electronic device 101 approaching any one external electronic device among the plurality of external electronic devices 301, 302, 303 or 304, the electronic device 101 may obtain the aforementioned unique signal dependent on the EMI through a sensing module (e.g., the EM sensor 210 of FIG. 2) or a communication module such as wireless communication module 192 or antenna module 197. The electronic device 101 may transmit the obtained unique signal data (i.e., first information) dependent on the EMI wherein an external EM server separately performs machine learning (ML) 320. The electronic device 101 may identify an external electronic device 305 on the basis of information (i.e., second information) which is calculated corresponding to the unique signal through the machine learning 320 operation. Information on the external electronic device 301, 302, 303, or 304 may be displayed through a display 160 of the electronic device 101. However, the present disclosure is not limited to this, and the information on the external electronic device 301, 302, 303, or 304 may be outputted auditorily as well.

The electronic device 101 may include a memory 130 storing a waveform table which includes a plurality of unique signals corresponding to the plurality of external electronic devices 301, 302, 303, or 304. In response to the electronic device 101 including the memory 130 which stores the waveform table which includes the plurality of unique signals corresponding to the plurality of external electronic devices 301, 302, 303, or 304, the processor 120 of the electronic device 101 may compare an EM signal acquired from the external electronic device 301, 302, 303, or 304 and the unique signal included in the waveform table, thereby identifying the corresponding external electronic device.

In response to the electronic device 101 approaching any one of the plurality of external electronic devices 301, 302, 303, or 304, after a function of the electronic device 101 associated with EM sensing is activated, the electronic device 101 may acquire an EM signal provided from the approached external electronic device. The acquired EM signal may be analyzed by a classifier stored in the electronic device 101 or may be transmitted to a server (e.g., an EM server) performing the EM signal analysis operation.

The classifier may perform an operation of identifying a model name of the external electronic device 301, 302, 303, or 304. The operation of identifying the model name of the external electronic device is performed by a separate server such as the server 108. After learning the identifying operation, the separate server may transmit learning data to the electronic device 101. The electronic device 101 may store the received learning data. Also, the classifier may be continuously refined for the sake of recognition accuracy improvement or target device addition. A learning algorithm may be a machine learning algorithm which includes at least one of deep learning, Gaussian mixture model (GMM), support vector machine (SVM) or random forest. According to various embodiments, the classifier for an EM signal may be implemented differently according to the machine learning algorithm.

The electronic device 101 or the EM server receiving an EM signal may have respective distinction models on the plurality of external electronic devices 301, 302, 303, or 304 capable of applying the machine learning 320. By applying the EM signal to the respective distinction models, the electronic device 101 or EM server may calculate a fitness corresponding to each external electronic device. By using the fitness, the electronic device 101 or the EM server may identify the model name of the external electronic device 301, 302, 303, or 304. The electronic device 101 or the EM server may have a frequency table applying various machine learning algorithms while applying various distinction models.

Figure 3B:
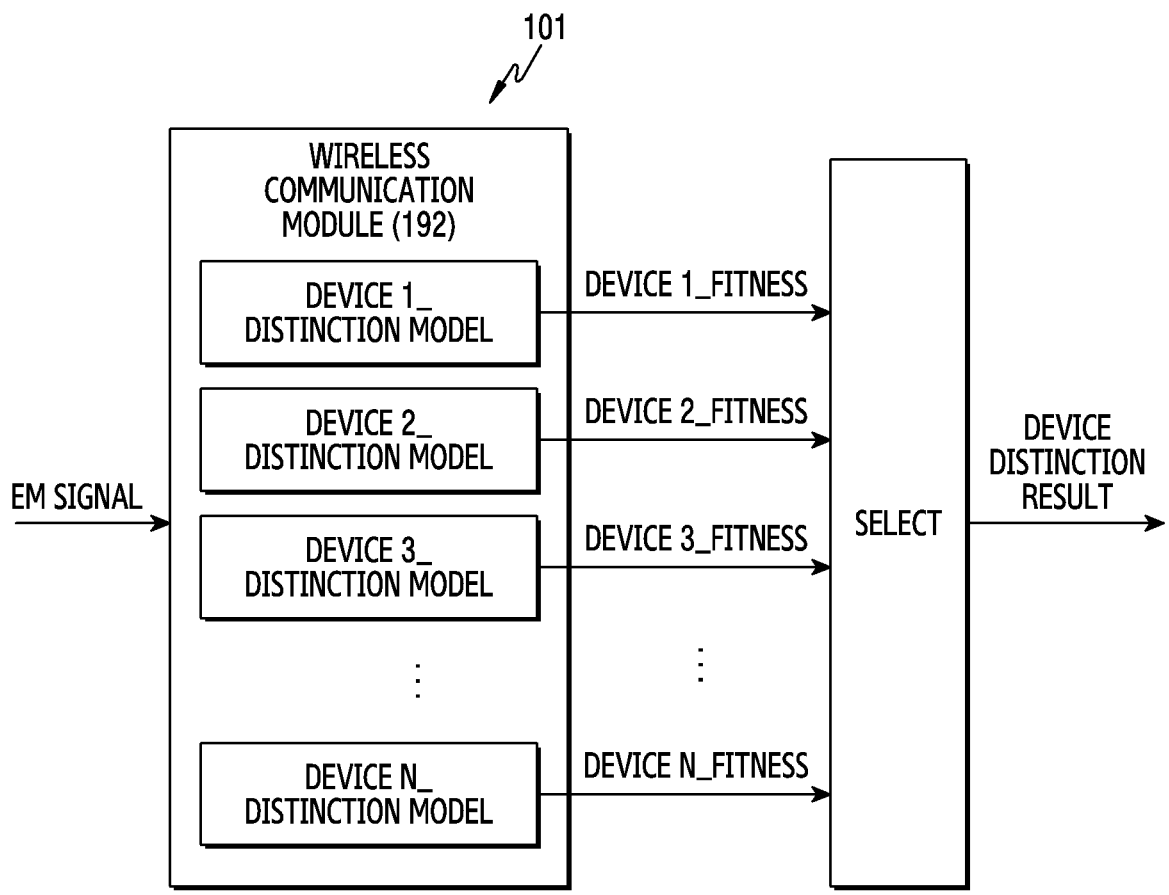
FIG. 3B is a block diagram of a machine learning process, according to an embodiment.

FIG. 3B is a block diagram of machine learning according to an embodiment.

Referring to FIG. 3B, for example, in response to the GMM scheme being applied, the classifier may perform an operation as illustrated in FIG. 3B. The electronic device 101 or the EM server receiving an EM signal may have respective distinction models on the plurality of external electronic devices 301, 302, 303, or 304 capable of applying the machine learning 320. By applying the EM signal to the respective distinction models, the electronic device 101 or the EM server may calculate a fitness corresponding to each external electronic device 301, 302, 303, or 304. The electronic device 101 or the EM server may identify a model name of the external electronic device by using the fitness. The electronic device 101 or the EM server may have a frequency table applying various machine learning algorithms while applying various distinction models.

In another example, the electronic device 101 or the EM server may use a deep learning based distinction model such as deep neural networks (DNNs) or convolutional neural networks (CNNs). In this case, unlike Gaussian mixture model-universal background model (GMM-UBM), a fitness of the entire N devices may be determined at a time.

The waveform table may be stored in the EM server which communicates with the electronic device 101 through a network. For example, the processor 120 of the electronic device 101 may transmit first information including an EM signal, to the EM server. The EM server may compare the EM signal included in the first information and a plurality of unique signals stored in the waveform table of the EM server, thereby identifying the external electronic device 301, 302, 303, or 304 providing the EM signal. The EM server may transmit information for identifying the identified external electronic device 301, 302, 303 or 304, to the electronic device 101.

The electronic device 101 may execute a specific application, based on identification information of a target device. For example, in response to the target device being identified as a TV, the electronic device 101 may automatically execute an application related to a remote controller capable of controlling the TV and concurrently, may automatically perform coupling with the TV. By getting the target device to stand-by in a controllable state by only using an operation of getting the electronic device 101 to approach the target device, a user's convenience may be enhanced.

Figure 4:
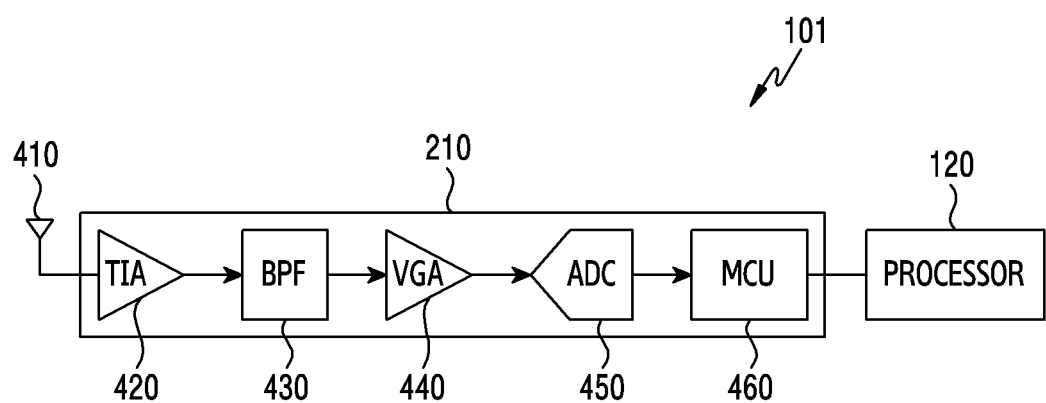
FIG. 4 is a block diagram illustrating elements of an electronic device for performing electromagnetic (EM) sensing, according to an embodiment.

FIG. 4 is a block diagram of elements of an electronic device for performing EM sensing according to an embodiment.

Referring to FIG. 4, the electronic device 101 may include an antenna 410, an EM sensing circuit 210, and the processor 120. The antenna 410 may obtain EM signals emitted from a plurality of external electronic devices (e.g., the external electronic devices 301 and 302 of FIG. 3A). The EM sensing circuit 210 may analyze the obtained EM signals. The processor 120 of the electronic device 101 may identify a target device by using obtaining information received from the EM sensing circuit 210.

The EM sensing circuit 210 include, a trans-impedance amplifier (TIA) 420, a bandpass filter (BPF) 430, a variable gain amplifier (VGA) 440, an analog-to-digital converter (ADC) 450, and a micro controller unit (MCU) 460.

The antenna 410 may have a reception bandwidth capable of receiving an EM signal. The trans-impedance amplifier 420 may amplify a frequency of 1 MHz or less received from the antenna 410. The bandpass filter 430 may pass a frequency component defining a characteristic pattern among a signal amplified and received from the trans-impedance amplifier 420, and filter out noise that is a frequency component irrelevant to the characteristic pattern.

The bandpass filter 430 may pass a frequency component of 1 MHz or less in the EM signal, and cut off a frequency component exceeding 1 MHz. The variable gain amplifier 440 may output a signal at a certain level over a given gain range so as to improve a noise characteristic of a filtered signal and an external interference signal cancellation characteristic. The analog-to-digital converter 450 may convert an analog signal provided from the variable gain amplifier 440 into a digital signal and, then, provide the digital signal to the MCU 460.

The MCU 460 may compare an EM signal converted into a digital signal and a waveform table stored in the electronic device 101, to identify an external electronic device. For instance, the MCU 460 may compare a maximum amplitude of the EM signal and a waveform format of the EM signal with a plurality of waveforms stored in the waveform table. The MCU 460 may provide the identified information to the processor 120 of the electronic device 101. However, the present disclosure is not intended to be limited to this, and the MCU 460 may directly provide the identified information to the processor 120 of the electronic device 101. In this case, an operation of identifying the target device through the waveform comparison may be carried out by the processor 120 of the electronic device 101.

To obtain an optimal input signal waveform, the electronic device 101 must minimize noise provided by the electronic device 101 in itself. A signal provided by the electronic device 101 may be applied to the EM sensing circuit 210, so there is a need to perform compensation for this. To minimize an input error, the electronic device 101 may recognize an internal noise by a touch screen input and, then, apply a compensation algorithm, and obtain a distortion waveform dependent on a grasp type at a plurality of antennas 410 configuration. In accordance with various conditions of the electronic device 101 such as a user's touch input or a state of grasping the electronic device 101, an EM signal sensed by the electronic device 101 may have a difference with an EM signal provided by a target device. The electronic device 101 may compare and continuously collect the measured EM signal and unique electromagnetic interference obtaining information of the target device. The collected information may be utilized for subsequent electromagnetic interference obtaining correction by discovering a correlation on electromagnetic interference obtaining information through big data analysis. The aforementioned big data analysis may include a technique such as regression analysis, clustering or association analysis.

To selectively obtain an EM signal through the EM sensing circuit 210, the processor 120 may control to provide the processor 120 with only EM signals complying with a set reference among the EM signals provided by the external electronic devices 301, 302, 303 or 304.

FIGS. 5, 6, 7, 8, 9, and 10 are flowcharts of methods of an electronic device and a memory device according to various embodiments. Operations thereof are described in detail below with reference to at least one of the aforementioned electronic devices of FIGS. 1, 2, 3A, 3B, and FIG. 4.

Figure 5:
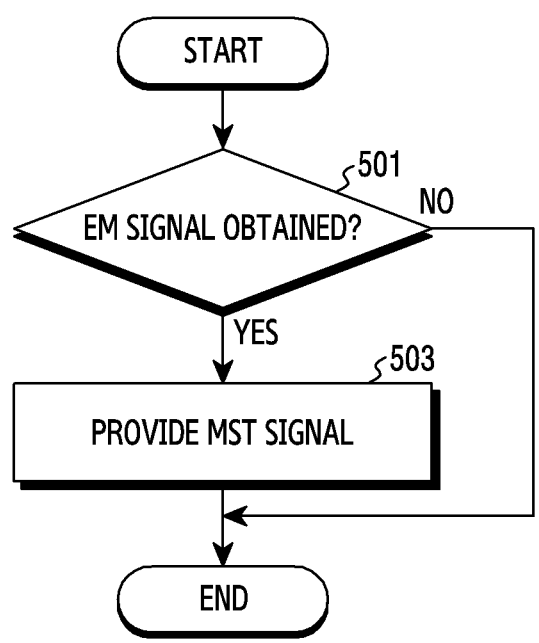
FIG. 5 is a flowchart of a method of an electronic device for sending a magnetic secure transmission (MST) signal based on obtaining an EM signal or not-obtaining the MST signal, according to an embodiment.

FIG. 5 is a flowchart of a method of an electronic device for sending an MST signal based on obtaining or not obtaining an EM signal, according to an embodiment.

Referring to FIG. 5, in step 501, the processor 120 of the electronic device 101 may obtain an EM signal emitted from the external electronic device 102, 104, 301, 302, 303, or 304. The processor 120 of the electronic device 101 may, for example, obtain the EM signal that is provided from the external electronic device 102, 104, 301, 302, 303, or 304 in response to the electronic device 101 approaching the external electronic device (e.g., the POS and/or the NFC reader), through the EM sensor 210 of FIG. 2 or wireless communication module 192 of FIG. 1 and the antenna module 197 of FIG. 1.

The processor 120 of FIG. 1 of the electronic device 101 may execute the application 146 for obtaining an EM signal and, accordingly, obtain and analyze the EM signal. For example, hardware such as the EM sensor 210 or the wireless communication module 192 for obtaining an EM signal and/or an application for obtaining an EM signal may be implemented to be activated only in response to a situation occurring in which there is a need for obtaining an EM signal, in order to decrease power consumption and prevent an erroneous operation. The hardware and/or application for obtaining an EM signal may be, for example, implemented to be activated in response to the running of applications for performing functions such as a magnetic field communication function or a wireless charging function. The hardware and/or application for obtaining an EM signal may be implemented to be activated in response to the running of one of arbitrary applications adapted to perform a function that uses an EM signal. The hardware and/or application for obtaining an EM signal may be implemented to be activated based on a user input or under various conditions such as a condition in which the electronic device 101 is located in a certain position and/or time or a condition in which the electronic device 101 is coupled with a certain device (e.g., a certain AP), or a combination of these conditions.

In step 503, the processor 120 obtaining the EM signal may control to provide an MST signal through an MST communication module (e.g., the MST communication module 230 of FIG. 2). The processor 120 may identify the EM signal obtained through the EM sensor 210, and identify external electronic device information (e.g., an external electronic device identification number or model number) corresponding to the identified EM signal. The processor 120 may identify an external electronic device providing the EM signal. Accordingly, the processor 120 may control the MST communication module 230 to provide an MST signal which has a sequence of a kind corresponding to the identified external electronic device model. For example, the POS may react to an MST signal of a mutually different type by its model or kind and, in this case, may process to distinguish EM signals provided by a POS model or kind and provide each MST signal of a corresponding type. The electronic device 101 may mutually match and previously store, in the memory 130 of FIG. 1, a model name, a kind name or an operation state of the POS or external electronic device and an EM signal corresponding to this and/or a corresponding MST signal type.

In response to the electronic device 101 approaching the external electronic device (e.g., the POS) and obtaining an EM signal from the external electronic device, the electronic device 101 may provide an MST signal. This may be a solution to the MST signal security problem or the consumption power increase problem caused by the electronic device 101 previously providing an MST signal before approaching the POS in a payment system such as Samsung Pay.

Figure 6:
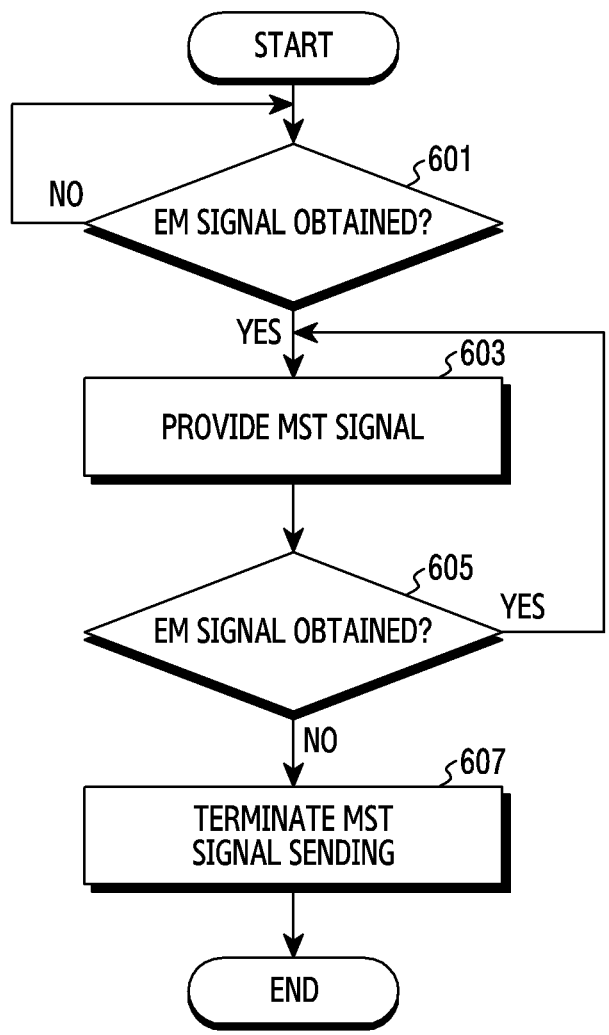
FIG. 6 is a flowchart of a method of an electronic device for terminating sending an MST signal based on obtaining an EM signal or not-obtaining the MST signal, according to an embodiment.

FIG. 6 is a flowchart of a method of the electronic device 101 for terminating MST signal sending based on obtaining or not obtaining an EM signal, according to an embodiment.

Referring to FIG. 6, in step 601, the processor 120 of the electronic device 101 may obtain an EM signal emitted from the external electronic device 102, 104, 301, 302, 303, or 304. The electronic device 101 may, for example, obtain the EM signal which is provided from the external electronic device 102, 104, 301, 302, 303, or 304 in response to the electronic device 101 approaching the external electronic device 102, 104, 301, 302, 303, or 304 (e.g., the POS and/or the NFC reader), through the EM sensor 210 of FIG. 2 or the wireless communication module 192 of FIG. 1 and the antenna module 197 of FIG. 1.

The processor 120 of FIG. 1 of the electronic device 101 may execute the application 146 for obtaining an EM signal and, accordingly, obtain and analyze an EM signal. Hardware such as the EM sensor 210 or the wireless communication module 192 for obtaining an EM signal and/or an application for obtaining an EM signal may be implemented to be activated only in response to a situation occurring in which there is a need for obtaining an EM signal, in order to decrease power consumption and prevent an erroneous operation. The hardware and/or application for obtaining an EM signal may be, for example, implemented to be activated in response to running applications for performing functions such as a magnetic field communication function or a wireless charging function. The hardware and/or application for obtaining an EM signal may be implemented to be activated in response to running one of arbitrary applications adapted to perform a function that uses an EM signal. The hardware and/or application for obtaining an EM signal may be implemented to be activated based on a user input or under various conditions such as a condition in which the electronic device 101 is located in a certain position and/or time or a condition in which the electronic device 101 is coupled with a certain device (e.g., a certain AP), or a combination of these conditions.

In step 603, the processor 120 obtaining the EM signal may provide an MST signal through the MST communication module 230 of FIG. 2. At this time, the processor 120 may identify the obtained EM signal, and identify external electronic device information (e.g., an identification number or model number of the external electronic device 102, 104, 301, 302, 303, or 304) corresponding to the identified EM signal. Accordingly, the processor 120 may identify the external electronic device providing the EM signal and accordingly, may control the MST communication module 230 to provide an MST signal of a kind corresponding to the identified external electronic device model. For example, the POS may react to an MST signal of a mutually different type by its model or kind and, in this case, may process to distinguish EM signals provided by a POS model or kind and provide each MST signal of a corresponding type. For this, the processor 120 of the electronic device 101 may mutually match and store, in the memory 130, a model name or a kind name of the POS or external electronic device 101 and an EM signal corresponding to this and/or a corresponding MST signal type.

In addition, in step 605, the processor 120 of the electronic device 101 may identify whether an EM signal is obtained by periods or after a given time. In response to not obtaining the EM signal during a given time interval in step 605, in step 607, the processor 120 may control the MST communication module 230 of FIG. 2 to terminate MST signal sending. The EM signal is provided based on an operation of the external electronic device 102, 104, 301, 302, 303, or 304. Thus, even in response to the EM signal being provided by the external electronic device 102, 104, 301, 302, 303, or 304, the processor 120 of the electronic device 101 may fail to obtain the EM signal in response to the electronic device 101 being mutually spaced apart from the external electronic device 102, 104, 301, 302, 303, or 304 more than an approaching distance in which it is possible to obtain the EM signal provided by the external electronic device 102, 104, 301, 302, 303 or 304. In addition, even in response to the external electronic device 102, 104, 301, 302, 303, or 304 not providing the EM signal, the processor 120 of the electronic device 101 may fail to obtain the EM signal. On the other hand, in response to failing to obtain the EM signal, the processor 120 may deactivate the hardware such as the EM sensor 210 or the wireless communication module 192 for obtaining an EM signal and/or an application for obtaining an EM signal, like turn-off, low-power running or terminating, to prevent power consumption and further enhance the security of an MST signal.

Accordingly, only while the electronic device 101 approaches the external electronic device 102, 104, 301, 302, 303, or 304 (e.g., the POS) and obtains an EM signal from the external electronic device 102, 104, 301, 302, 303, or 304 does the electronic device 101 may provide an MST signal. This may be a solution to the MST signal security problem or the consumption power increase problem caused by the electronic device 101 previously providing an MST signal before approaching the POS and providing an MST signal even after payment is finished, in a payment system such as Samsung Pay™.

Figure 7:
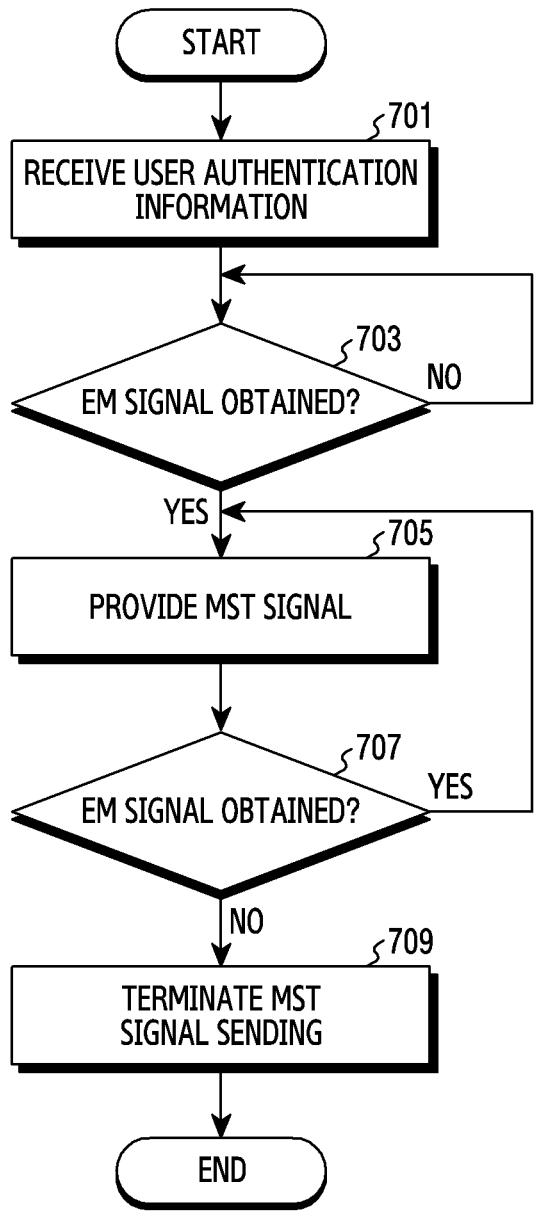
FIG. 7 is a flowchart of a method of an electronic device for controlling sending an MST signal based on obtaining an EM signal or not-obtaining the MST signal after user authentication information reception, according to an embodiment.

FIG. 7 is a flowchart of a method of an electronic device (e.g., the electronic device 101 of FIG. 1) for controlling MST signal sending based on obtaining or not obtaining an EM signal after reception of user authentication information, according to an embodiment.

Referring to FIG. 7, in step 701, the processor 120 of the electronic device 101 receives user authentication information such as, for example, fingerprint or iris information from a user by an operation such as, for example, electronic payment application execution or specified application execution.

For example, in response to a user executing an electronic payment application and inputting fingerprint or iris information for the sake of electronic payment, the processor 120 of FIG. 1 of the electronic device 101 may receive user authentication information through the sensor module 176 of FIG. 1 (e.g., a fingerprint sensor or an iris sensor).

The processor 120 of the electronic device 101 may store, in the memory 130 of FIG. 1, applications capable of performing a certain function by using an EM signal among the aforementioned electronic payment applications or arbitrary applications, for example, as a list.

In response to one of these certain applications being executed or related data (e.g., user authentication information) being received according to the execution, in step 703, the processor 120 identifies whether an EM signal is obtained through the EM sensor 210 of FIG. 2 or the wireless communication module 192 of FIG. 2 and the antenna module 197 of FIG. 2. The processor 120 may control to run hardware such as the EM sensor 210 or the wireless communication module 192 for obtaining an EM signal and an application for obtaining an EM signal, and receive the EM signal.

In step 705, the processor 120 obtaining the EM signal controls to run the MST communication module 230 of FIG. 2, and provides an MST signal. The processor 120 may identify the obtained EM signal, and identify external electronic device information (e.g., an identification number or a model number of the external electronic device 102, 104, 301, 302, 303, or 304) corresponding to the identified EM signal. Accordingly, the processor 120 may identify the external electronic device 102, 104, 301, 302, 303, or 304 providing the EM signal and accordingly, may control the MST communication module 230 to provide an MST signal of a kind corresponding to a model of the identified external electronic device 102, 104, 301, 302, 303, or 304. The processor 120 of the electronic device 101 may mutually match and store, in the memory 130, a model name, a kind name or an operation state of the external electronic device 102, 104, 301, 302, 303, or 304 and an EM signal corresponding to this and/or a corresponding MST signal type.

In step 707, the processor 120 of the electronic device 101 identifies whether an EM signal is obtained during a given time by periods. In response to not obtaining the EM signal, in step 709, the processor 120 may control the MST communication module 230 of FIG. 2 to terminate MST signal sending. Furthermore, the processor 120 may deactivate the hardware such as the EM sensor 210 or the wireless communication module 192 for obtaining an EM signal and/or the application for obtaining an EM signal, such as turn-off, low-power running or terminating, to prevent power consumption and further enhance the security of an MST signal.

An actual consumption current dependent on MST signal provision is about 2 amperes (A) or so and a power consumption amount is large. Accordingly, only while the electronic device 101 approaches the external electronic device 102, 104, 301, 302, 303, or 304 (e.g., the POS) and obtains an EM signal from the external electronic device 102, 104, 301, 302, 303, or 304 does the electronic device 101 provide an MST signal. This may be a solution to the MST signal security problem or the consumption power increase problem caused by that the electronic device 101 previously providing an MST signal before approaching the POS and providing an MST signal even after payment is finished.

Figure 8:
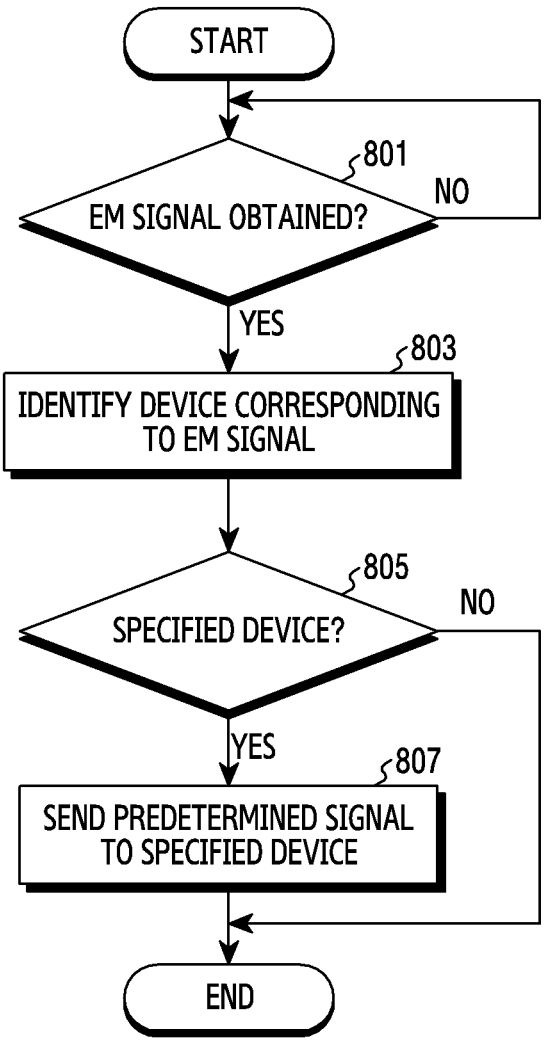
FIG. 8 is a flowchart of a method of an electronic device for, based on obtaining an EM signal, identifying a specified device and controlling sending an MST signal, according to an embodiment.

FIG. 8 is a flowchart of a method of an electronic device for, based on obtaining an EM signal, identifying a specified device and controlling MST signal sending according to an embodiment.

Referring to FIG. 8, in step 801, the processor 120 of the electronic device 101 obtains an EM signal emitted from the external electronic device 102, 104, 301, 302, 303 or 304. The electronic device 101 may obtain the EM signal which is provided from the external electronic device 102, 104, 301, 302, 303, or 304 in response to the electronic device 101 approaching the external electronic device 102, 104, 301, 302, 303, or 304 (e.g., the POS and/or the NFC reader), through the EM sensor 210 of FIG. 2 or the wireless communication module 192 and the antenna module 197.

In step 803, the processor 120 of FIG. 1 of the electronic device 101 analyzes the obtained EM signal and compare an external electronic device type corresponding to the EM signal stored in the memory 130, to identify a type of the corresponding external electronic device. The type of the external electronic device 102, 104, 301, 302, 303, or 304 may, for example, include a kind name and a model name of the external electronic device 102, 104, 301, 302, 303, or 304.

In step 805, the processor 120 identifies whether the identified external electronic device 102, 104, 301, 302, 303 or 304 corresponds to a given external electronic device. In response to the identified external electronic device being the given external electronic device, in step 807, the processor 120 may send the given external electronic device a signal of a type specified for the corresponding external electronic device. For example, the processor 120 may be implemented to, in response to identifying that the external electronic device providing the corresponding EM signal is an external electronic device of a certain type based on the obtained EM signal analysis, transmit an MST signal of a certain type capable of being recognized by the corresponding external electronic device, or transmit an NFC signal of the certain type.

For this, the memory 130 of FIG. 1 of the electronic device 101 may store a list of kind names and/or model names of the external electronic devices 102, 104, 301, 302, 303, or 304 with which the electronic device 101 permits coupling. In response to being included in a permission list and being identified as a specified device, the processor 120 may send a predetermined signal to a specified device through the MST communication module 230 of FIG. 2 or the NFC communication module 240 of the wireless communication module 197 and, accordingly, may perform communication with the specified device.

The memory 130 of the electronic device 101 may store a list of kinds and model names of the external electronic devices 102, 104, 301, 302, 303, or 304 with which the electronic device 101 blocks coupling. In this case, in response to not being included in a permission list unlike FIG. 8 and thus being identified that it is not a specified device, communication with the corresponding external device 102, 104, 301, 302, 303, or 304 may be carried out.

Accordingly, the electronic device 101 may block communication with the external electronic device not permitted for coupling, thereby preventing a problem caused by coupling with an external device of a problematic type.

Figure 9:
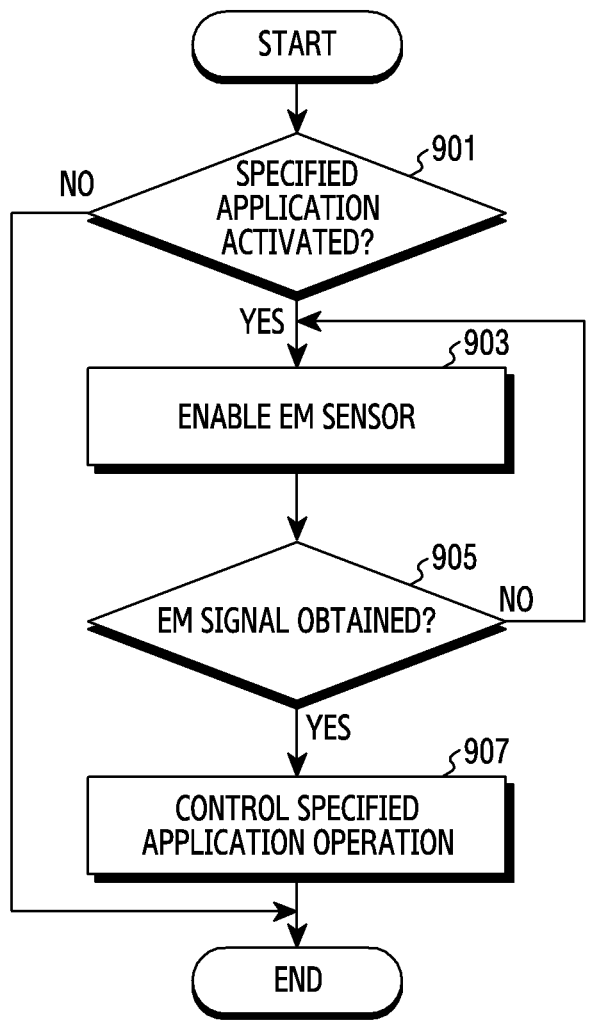
FIG. 9 is a flowchart of a method of an electronic device for enabling an EM sensor based on specified application activation, according to an embodiment.

FIG. 9 is a flowchart of an electronic device (e.g., the electronic device 101 of FIG. 1) for enabling an EM sensor based on certain application activation, according to an embodiment.

In step 901, the processor 120 of the electronic device 101 identifies whether an electronic payment application or a certain application has been executed and activated. The certain application is an application which is specified to use the aforementioned EM sensor signal. For example, the certain application may include an application a user directly selects and executes, such as a payment application (e.g., Samsung Pay™, Samsung Connect™, Bixby™) that uses an NFC or MST signal. The processor 120 of the electronic device 101 may store, in the memory 130, applications capable of performing a certain function by using an EM signal among the aforementioned electronic payment applications or arbitrary applications, for example, as a list.

On the other hand, when it is identified that the certain application is activated may, for example, include a case where the display 160 of FIG. 1 is turned on (e.g., changed from a sleep mode to an active mode), and may include a case where the electronic device 101 or the certain application is in a certain state, such as a case where the electronic device 101 is obtained at a specified position or time and/or a case where the electronic device 101 is coupled with a specific device (e.g., a specified AP).

In response to at least one of the certain applications being executed and activated, in step 903, the processor 120 controls to supply power to an EM sensor (e.g., the EM sensor 210 of FIG. 2) and enable the EM sensor. In step 905, the processor 120 identifies whether an EM signal is obtained through the EM sensor 120 supplied with power and enabled. That is, the processor 120 may control to supply power to the EM sensor 210 and run the EM sensor 120 for obtaining an EM signal, and receive the EM signal through the running EM sensor 120. The EM signal may be obtained in response to the EM sensor 120 of the electronic device 101 approaching an external electronic device that emits the EM signal.

In response to obtaining the EM signal, in step 907, the processor 120 controls an operation of the aforementioned certain application, based on the obtained EM signal.

For example, in response to an external electronic device (e.g., an NFC reader or a POS), which has sent a corresponding EM signal, being a device not permitted for coupling or being a device which must use an MST signal of a certain sequence based on EM signal analysis, the processor 120 may control to block an application for wireless communication to neither perform communication nor provide the MST signal of the certain sequence.

For example, in response to the certain application being a wireless charging application, in response to the external electronic device 102, 104, 301, 302, 303 or 304 being an external electronic device that is not permitted for coupling or is permitted for a current of a certain value or less, the processor 120 may control charging power. For example, the processor 120 may control the power management module 188 to block charging power to the external electronic device or charge the external electronic device at a current of a certain value or less.

Figure 10:
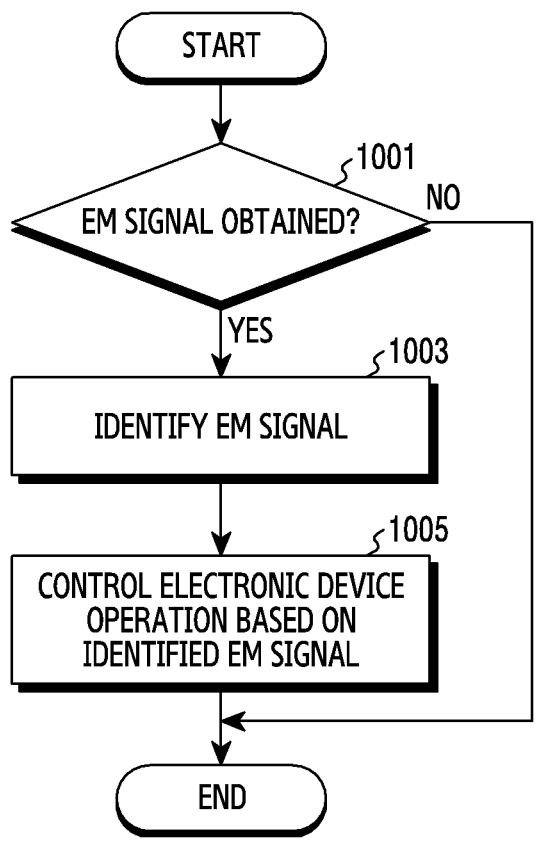
FIG. 10 is a flowchart of a method of an electronic device for performing a specified control operation based on an identified EM signal, according to an embodiment.

FIG. 10 is a flowchart of a method of the electronic device 101 for performing a certain control operation based on an identified EM signal, according to an embodiment.

Referring to FIG. 10, in step 1001, the processor (e.g., the processor 120 of FIG. 2) of the electronic device 101 identifies whether an EM signal is obtained through an EM sensor (e.g., the EM sensor 210 of FIG. 2). The EM sensor 210 may be implemented to be supplied with power and be run only in a necessary case, to receive the EM signal.

In response to the EM signal being obtained, in step 1003, the processor 120 identifies the obtained EM signal. For this, the processor 120 may store a waveform table including a plurality of unique signals in the memory 130 of FIG. 1 and, based on this, may compare the obtained EM signal, thereby identifying the EM signal. On the other hand, the processor 120 of the electronic device 101 may transmit the obtained EM signal to a server (e.g., an EM server) performing an EM signal analysis operation and receive information on a type of a device corresponding to the obtained EM signal.

In step 1005, the processor 120 controls an operation of the electronic device 101 based on the identified EM signal.

For example, in response to the external electronic device 102, 104, 301, 302, 303, or 304 (e.g., the NFC reader), which has sent the corresponding EM signal, being identified to have the compatibility problem based on EM signal analysis, the processor 120 may reset a radio frequency (RF) register of an NFC communication module (e.g., the NFC communication module 240 of FIG. 2) for wireless NFC signal transmission, as a value optimized to the corresponding NFC reader.

In response to the external electronic device (e.g., the wireless charging pad), which has sent the corresponding EM signal, being a device which is not permitted for coupling or being a device of a type which is set to limitedly charge only at a current magnitude of a certain current or less based on the EM signal, the processor 120 may control the power management module (e.g., the power management module 188 of FIG. 2) to block or limit power a wireless charging module (e.g., the wireless charging module 250 of FIG. 2) receives from the external electronic device (e.g., the wireless charging pad) through a wireless charging antenna (e.g., 197-5), to the certain current or less.

The electronic device 101 may include a first sensor (e.g., the EM sensor 210 of FIG. 2) for obtaining an EM signal from the external device 102, 104, 301, 302, 303 or 304, a first communication module (e.g., the MST communication module 230 of FIG. 2) for providing an MST signal, the processor 120, and the memory (e.g., the memory 130 of FIG. 1) coupled with the processor 120. The memory 130 may include instructions of, at execution, controlling the first communication module 230 wherein the processor 120 transmits, to the external electronic device 102, 104, 301, 302, 303 or 304, an MST signal which is predetermined corresponding to the external device 102, 104, 301, 302, 303 or 304 based on the obtained EM signal.

The memory 130 of the electronic device 101 may store a table which includes a predetermined MST signal corresponding to each of a plurality of EM signals.

The electronic device 101 may further include a second communication module (e.g., the wireless communication module 192 or wired communication module 194 of FIG. 1) for communicating with an external server (e.g., the external server 108 of FIG. 1). The instructions may control the processor 120 to transmit the obtained EM signal data to the external server 108, and receive device information corresponding to the EM signal from the external server 108.

The electronic device 101 may further include a second sensor (e.g., the sensor module 176 of FIG. 1) for receiving authentication information from a user. The instructions may control the processor 120 to, in response to user authentication information being inputted through the second sensor 176, supply power to the first sensor 210 and obtain the EM signal through the first sensor 210.

The instructions may control the processor 120 to terminate the MST signal transmission in response to not obtaining the EM signal during a given time.

The instructions may control the processor 120 to identify whether an application specified to operate using the EM signal has been activated, and in response to the application being activated, supply power to the first sensor 210 and obtain the EM signal through the first sensor 210.

The memory 130 of the electronic device 101 may store a table including device information corresponding to each of a plurality of EM signals. The instructions may control the processor 120 to identify the device information corresponding to the obtained EM signal, and identify whether to transmit or block an MST signal based on the device information.

The device information may be identification information of the external device 102, 104, 301, 302, 303, or 304.

A method for controlling in the electronic device 101 having the first sensor 210 for obtaining an EM signal and the first communication module 230 for providing an MST signal, includes obtaining an EM signal from the external device 102 104, 301, 302, 303 or 304, and transmitting an MST signal which is predetermined corresponding to the external device 102, 104, 301, 302, 303 or 304 based on the obtained EM signal.

The electronic device 101 may further include the memory 130 storing a table which includes a predetermined MST signal corresponding to each of a plurality of EM signals, and the transmitting of the predetermined MST signal may provide the predetermined MST signal corresponding to the obtained EM signal stored in the memory 130.

The method for controlling in the electronic device 101 may further include communicating with an external server, to transmit the obtained EM signal data and receive device information corresponding to the EM signal.

The electronic device 101 may further include the second sensor 176 for receiving authentication information from a user, and the method may further include identifying the user authentication information inputted through the second sensor 176, and in response to the user authentication information being identified, controlling to supply power to the first sensor 210 and obtain the EM signal through the first sensor 210.

The method for controlling in the electronic device 101 may further include terminating the MST signal transmission in response to not obtaining the EM signal during a given time.

The method for controlling in the electronic device 101 may further include identifying whether an application which is predetermined to operate using the EM signal has been activated, and in response to the application being activated, controlling to supply power to the first sensor 210 and obtain the EM signal through the first sensor 210.

The electronic device 101 may further include the memory 130 storing a table which includes device information corresponding to each of a plurality of EM signals, and the method for controlling in the electronic device 101 may further include identifying the device information corresponding to the obtained EM signal, and identifying whether to transmit or block the MST signal based on the device information.

In the method for controlling in the electronic device 101, the device information may be identification information of the external device 102, 104, 301, 302, 303, or 304.

The electronic device 101 may include the EM sensor 210 for obtaining an EM signal from at least one external device 102, 104, 301, 302, 303, or 304, the MST communication module 230 for providing an MST signal, and the processor 120 for controlling the MST communication module 230 to transmit, to the external device, an MST signal which is predetermined corresponding to the at least one external device 102, 104, 301, 302, 303, or 304 based on the EM signal.

The processor 120 may control to supply power to the EM sensor 210 and obtain the EM signal through the EM sensor 210, in response to an application, which is predetermined to operate using the EM signal, being activated.

The processor 120 may control the MST communication module 230 to terminate the MST signal transmission, in response to not obtaining the EM signal during a given time.

The electronic device 101 may further include the memory 130 storing a table which includes device information corresponding to each of a plurality of EM signals.

The processor 120 may identify the device information corresponding to the obtained EM signal, and control the MST communication module 230 to transmit the MST signal corresponding to the device information.

Methods of the present disclosure described in the present disclosure and the appended claims may be implemented in the form of hardware, software, or a combination of hardware and software.

In response to being implemented in software, a non-transitory computer-readable storage media storing one or more programs (i.e., software modules) may be provided. The one or more programs stored in the non-transitory computer-readable storage media are configured to be executable by one or more processors within an electronic device. The one or more programs include instructions for enabling the electronic device to execute the methods of the embodiments described in the present disclosure and the appended claims.

These programs (i.e., software modules and/or software) may be stored in a random access memory (RAM), a non-volatile memory including a flash memory, a read only memory (ROM), an electrically erasable programmable ROM (EEPROM), a magnetic disc storage device, a compact disc ROM (CD-ROM), digital versatile discs (DVDs), an optical storage device of another form, and/or a magnetic cassette. In addition, the program may be stored in a memory that is constructed in a combination of some or all of the above-identified components. Furthermore, each constructed memory may be included in plural.

Moreover, the program may be stored in an attachable storage device that may access through a communication network such as the Internet, an intranet, a LAN, a wireless LAN (WLAN) or a storage area network (SAN), or a communication network configured in combination of them. This storage device may connect to a device performing an embodiment of the present disclosure through an external port. In addition, a separate storage device on the communication network may connect to the device performing the embodiment of the present disclosure.

In the present disclosure, elements have been expressed in the singular or plural according to an embodiment. However, the expression of the singular or plural is selected suitable to a given situation for the sake of description convenience, but the present disclosure is not intended to be limited to singular or plural elements. An element expressed in the plural may be constructed in the singular, or an element expressed in the singular may be constructed in the plural.

While a detailed description of the present disclosure describes an embodiment, it is undoubted that various modifications are available without departing from a scope of the present disclosure. Therefore, the scope of the present disclosure is not intended to be limited to an embodiment but is defined by the appended claims and their equivalents.

An electronic device for controlling a magnetic field communication related function based on obtaining an electromagnetic signal may, before or in the beginning of magnetic field communication execution, identify an external device or acquire information on the external device, and control the magnetic field communication related function.

The electronic device may minimize a power loss and strengthen device security based on magnetic field communication related function control, and further may improve an MST signal recognition rate.

An effect obtainable from the present disclosure is not limited to the above-mentioned effects, and other effects not mentioned will be able to be understood from the appended claims by a person having ordinary skill in the art to which the present disclosure pertains.

What is claimed is:

1. An electronic device, comprising:
a first sensor configured to obtain an electromagnetic (EM) signal from an external device;
a first communication module configured to provide a magnetic stripe transmission (MST) signal;
a processor; and
a memory coupled with the processor,
wherein the memory is configured to store instructions which, upon execution, instruct the processor to control the first communication module to transmit, to the external device, the MST signal which is a predetermined sequence type that corresponds to an identification number, a model number, a model, or a kind of the external device based on the obtained EM signal.

2. The electronic device of claim 1, wherein the memory is configured to store a table which comprises a predetermined MST signal corresponding to each of a plurality of EM signals.

3. The electronic device of claim 1, further comprising a second communication module configured to communicate with an external server,
wherein the instructions further instruct the processor to transmit the obtained EM signal data to the external server and receive device information corresponding to the EM signal from the external server.

4. The electronic device of claim 1, further comprising a second sensor configured to receive authentication information from a user,
wherein the instructions further instruct the processor to supply power to the first sensor, and obtain the EM signal through the first sensor, in response to user authentication information being inputted through the second sensor.

5. The electronic device of claim 1, wherein the instructions further instruct the processor to terminate the MST signal transmission, in response to not obtaining the EM signal during a given time.

6. The electronic device of claim 1, wherein the instructions further instruct the processor to identify whether an application which is predetermined to operate using the EM signal has been activated, and in response to the application being activated, supply power to the first sensor and obtain the EM signal through the first sensor.

7. The electronic device of claim 1, wherein the memory is further configured to store a table which comprises device information corresponding to each of a plurality of EM signals, and
the instructions further instruct the processor to identify the device information corresponding to the obtained EM signal, and identify whether to transmit or block the MST signal based on the device information.

8. The electronic device of claim 3, wherein the device information is identification information of the external device.

9. A method for controlling in an electronic device having a first sensor configured to obtain an electromagnetic (EM) signal and a first communication module configured to provide a magnetic stripe transmission (MST) signal, the method comprising:
obtaining the EM signal from an external device; and
transmitting the MST signal which is a predetermined sequence type that corresponds to an identification number, a model number, a model, or a kind of the external device based on the obtained EM signal.

10. The method of claim 9, further comprising storing a table in a memory of the electronic device which comprises a predetermined MST signal corresponding to each of a plurality of EM signals, and
wherein transmitting the MST signal provides the MST signal corresponding to the obtained EM signal stored in the memory.

11. The method of claim 9, further comprising communicating with an external server, to transmit the obtained EM signal data and receive device information corresponding to the EM signal.

12. The method of claim 9, wherein the electronic device further comprises a second sensor configured to receive authentication information from a user, and
further comprising:
identifying the user authentication information inputted through the second sensor; and
in response to the user authentication information being identified, controlling to supply power to the first sensor and obtain the EM signal through the first sensor.

13. The method of claim 9, further comprising terminating the MST signal transmission in response to not obtaining the EM signal during a given time.

14. The method of claim 9, further comprising:
identifying whether an application which is predetermined to operate using the EM signal has been activated; and
in response to the application being activated, controlling to supply power to the first sensor, and obtain the EM signal through the first sensor.

15. The method of claim 9, wherein the electronic device further comprises a memory configured to store a table which comprises device information corresponding to each of a plurality of EM signals, and
further comprising:
identifying the device information corresponding to the obtained EM signal; and
identifying whether to transmit or block the MST signal based on the device information.

16. The method of claim 12, wherein the device information is identification information of the external device.

17. An electronic device, comprising:
an electromagnetic (EM) sensor configured to obtain an EM signal from at least one external device;
a magnetic stripe transmission (MST) communication module configured to provide an MST signal; and
a processor configured to control the MST communication module to transmit, to the external device, the MST signal which is a predetermined sequence type that corresponds to an identification number, a model number, a model, or a kind of the at least one external device based on the obtained EM signal.

18. The electronic device of claim 17, wherein the processor is further configured to control to supply power to the EM sensor and obtain the EM signal through the EM sensor, in response to an application, which is predetermined to operate using the EM signal, being activated.

19. The electronic device of claim 17, wherein the processor is further configured to control the MST communication module to terminate the MST signal transmission, in response to not obtaining the EM signal during a given time.

20. The electronic device of claim 17, further comprising a memory configured to store a table which comprises device information corresponding to each of a plurality of EM signals,
wherein the processor is further configured to identify the device information corresponding to the obtained EM signal, and control the MST communication module to transmit the MST signal corresponding to the device information.

* * * * *